(12) United States Patent
Lee (10) Patent No.: US 6,922,125 B2
(45) Date of Patent: Jul. 26, 2005

(54) ELECTROCONDUCTIVE INK PRINTED CIRCUIT ELEMENT

(75) Inventor: Brian Craig Lee, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 102 days.

(21) Appl. No.: 09/917,461

(22) Filed: Jul. 27, 2001

(65) Prior Publication Data

US 2003/0020584 A1 Jan. 30, 2003

(51) Int. Cl.⁷ ................................................ H01F 5/00
(52) U.S. Cl. ..................................... 336/200; 336/232
(58) Field of Search ............................ 336/65, 83, 200, 336/206–208, 232

(56) References Cited

U.S. PATENT DOCUMENTS

| | | | |
|---|---|---|---|
| 5,392,020 A | * | 2/1995 | Chang ........................ 336/200 |
| 5,808,637 A | | 9/1998 | Wenzel et al. ................ 347/53 |

OTHER PUBLICATIONS

'New Printing Technologies Raise Hopes for Cheap Plastic Electronics', by Barbara Goss Levi; Physics Today, Feb. 2001. vol. 54, pp. 20–22, no date.
'Ink–jet dots form transistor spots', by P. Weiss; Science News, Dec. 2000, vol. 158, Issue 26 & 27, p. 407, no date.

* cited by examiner

Primary Examiner—Tuyen T Nguyen (57) ABSTRACT

Circuit Elements such as capacitors and inductors are formed from electroconductive material printed on a sheet. By printing lines in electroconductive material on both sides of a sheet, a capacitor is generated with the sheet serving as the capacitor's dielectric. If a series of parallel lines is printed at an angle with respect to a sheet and the sheet is subsequently rolled so that one end of each line engages another line to create a coil and the ends of the coil are connected across a current source, an inductor is created. The inductor can be used with another inductor to form a transformer. If two identical inductor sheets are placed one on top of the other and both are rolled to form concentric inductors, the resultant circuit element has both inductance and capacitance properties.

8 Claims, 6 Drawing Sheets

ELECTROCONDUCTIVE INK PRINTED CIRCUIT ELEMENT

BACKGROUND OF THE INVENTION

The basic capacitor comprises two electroconductive plates separated by an insulator (i.e., dielectric), and relies on the separation of the plates to produce a voltage potential when the plates of the capacitor are connected to a voltage source. Typically, capacitor dielectrics are made from ceramics, mica, oil, oil, or chemical film separation. Capacitors of this nature can be costly to produce. Moreover, typical capacitors of this nature are manufactured with predetermined capacitances which are not easily changed due to their rigid form. Although variable capacitors are available, they present additional considerations such as cost. Finally, typical capacitors are often manufactured with unsatisfactory capacitance tolerances.

Accordingly, there is a need for a capacitor which: (a) is capable of being mass-produced at low cost; (b) is easily modified to alter its capacitance properties; and (c) may be manufactured with satisfactory capacitance tolerances.

An inductor in its basic form is a coil of wire through which alternating current flows, thereby generating an electromagnetic field. A transformer in its basic form comprises two or more inductors wrapped together or standing side-by-side; current applied through one of the inductors creates a magnetic field which induces a current to flow in the other inductor. Depending on the ratio of the number of windings in the first inductor to the number of windings in the second inductor, the voltages of the inductors may differ. Inductors, which are a staple in circuit design, are typically used in frequency chokes, resonance circuits, electromagnets, and power supplies. Unfortunately, inductors are usually fabricated in rigid form and with predetermined inductance values. Moreover, most conventional inductors are not produced at a low cost nor are they produced with strict inductance tolerances.

Accordingly, there is a need for an inductor which: (a) is capable of being mass-produced at low cost and with strict inductance tolerances; (b) is easily modified to alter its inductance properties; and (c) may be bent due to a non-rigid nature.

SUMMARY

A solution to one or more of the aforementioned deficiencies in the art can be obtained by the electroconductive ink printed circuit elements described herein.

One such element herein described relates to a capacitor which is made from a first sheet having a top side and a bottom side. A first capacitor plate is formed by a first marking printed in electroconductive material on the top side of the first sheet whereas a second capacitor plate is formed by a second marking printed in electroconductive material on the bottom side of the first sheet. In this embodiment, the second marking is printed substantially directly below the first marking to form a capacitor adapted to be connected to a current source. Moreover, the first sheet can be selected from a number of materials including coated or uncoated paper, fabric, plastic (transparent, translucent or opaque, coated or uncoated with an ink-receptive layer), Mylar, Tyvek, and paperboard.

This capacitor can be used to form a multiplate capacitor which includes an insulator and a second sheet having a top side and a bottom side. In this further embodiment, a third capacitor plate is formed by a third marking printed in electroconductive material on the top side of the second sheet and a fourth capacitor plate is formed by a fourth marking printed in electroconductive material on the bottom side of the second sheet. The fourth marking is printed substantially directly below the third marking. To form the multiplate capacitor, the first sheet and the second sheet are superimposed such that the second marking is separated from the third marking by the insulator. The first and fourth markings are adapted to have a voltage source thereacross. Similar to the capacitor previously mentioned, the sheets forming the multiplate capacitor can be a variety of materials including coated or uncoated paper, fabric, plastic (transparent, translucent or opaque, coated or uncoated with an ink-receptive layer), Mylar, Tyvek, and paperboard. Moreover, in either the capacitor or the multiplate capacitor, the markings may be printed with inkjet ink or laserjet toner.

Another multiplate capacitor embodiment involves covering the first marking with an insulator and then printing a third marking on top of the insulator to form a different multiplate capacitor which is adapted to be connected to a current source.

Another such circuit element herein described involves an inductor component which is formed using a first sheet having a top side and a bottom side. A first series of parallel lines having first and second ends is printed: (a) in electroconductive material on the top side of the first sheet; and (b) at a first angle with respect to a first edge of the first sheet. The first angle is non-normal to the first edge of the first sheet. In this embodiment, the first ends of the first series of parallel lines extend to the first edge and the first sheet is adapted to be rolled. The second ends of the first series of parallel lines may extend to a second edge of the first sheet opposite the first edge.

If the inductor component's first sheet is rolled, each of the first ends of the first series of parallel lines at the first edge of the first sheet will engage a point on a different line in the first series of parallel lines to form a first coil. The points at which the first ends engage a different line may be the second ends of the first series of parallel lines. To create an inductor, the ends of the first coil are adapted to be connected to a current source to create a voltage potential across the length of the first coil.

The inductor component may also include a second series of parallel lines (each with first and second ends) printed in electroconductive material on the bottom side of the first sheet. In this embodiment, the second series of parallel lines is printed at a second angle with respect to the first edge of the first sheet and extends to the first edge of the first sheet. The second angle is non-normal to the first edge of the first sheet. When the first sheet is rolled, each of the first ends of the second series of parallel lines at the first edge of the first sheet engages a point on a different line in the second series of parallel lines to form a second coil; the ends of the second coil are adapted to be connected to a current source. In this embodiment, the first series of parallel lines is substantially superimposed directly over the second series of parallel lines. Moreover, when the first sheet is rolled to form the first coil and second coil, the first sheet is adapted to have inductance and capacitance properties when the ends of the first coil and second coil are connected across a current source.

A second embodiment of an inductor includes a second sheet having a top side and a bottom side. A second series of parallel lines (each having first and second ends) is printed in electroconductive material on the top side of the second sheet. The second series of parallel lines is printed at a second angle with respect to a first edge of the second sheet; the second angle is non-normal to the first edge of the second sheet. The first ends of the second series of parallel lines extend to the first edge of the second sheet. In this embodiment, the second sheet is rolled so that each of the first ends of the second series of parallel lines at the first edge of the second sheet will engage a point on a different line in the second series of parallel lines to form a second coil. The ends of the second coil are adapted to be connected to other circuit components.

When a second sheet is used, as described above, the first sheet may be superimposed over the second sheet such that the bottom side of the first sheet is in contact with the top side of the second sheet. In such a fashion, the first series of parallel lines is substantially superimposed directly over the second series of parallel lines. Moreover, when the sheets are rolled, the rolling is concentric thereby forming a first coil and second coil. In this embodiment, the concentric sheets are adapted to have inductance and capacitance properties when the ends of the first coil are connected across a current source whereas the ends of the second coil are adapted to be connected to other circuit components.

In any of the inductor component embodiments, the first and second sheets can be a variety of materials including coated or uncoated paper, fabric, plastic (transparent, translucent or opaque, coated or uncoated with an ink-receptive layer), Mylar, Tyvek, and paperboard. Moreover, the electroconductive material printed on the first and the second sheets can be inkjet ink or laserjet toner. Finally, the first series of parallel lines can be printed in a gradient so that when the first sheets is rolled, a resultant inductor is adapted to be slug tuned.

Another such circuit element herein described involves a transformer having a first sheet having a top side and a bottom side. A first series of parallel lines (each with first and second ends) is printed in electroconductive material on the top side of the first sheet. A second sheet, having a top side and a bottom side, has a second series of parallel lines (each with first and second ends) printed on the top side thereof. The first series of parallel lines is printed at a first angle with respect to a first edge of the first sheet; the first angle is non-normal to the first edge of the first sheet. The first ends of the first series of parallel lines extend to the first edge of the first sheet. Similarly, the second series of parallel lines is printed at a second angle with respect to a first edge of the second sheet; the second angle is non-normal to the first edge of the second sheet. The first ends of the second series of parallel lines extend to the first edge of the second sheet.

In this embodiment of the transformer, either the magnitude of the second angle is different from the magnitude of the first angle or the number of lines in the first series of parallel lines per unit length of the first sheet is different from the number of lines in the second series of parallel lines per unit length of the second sheet. The first sheet is rolled so that each of the first ends of the first series of parallel lines at the first edge of the first sheet engages a point on a different line in the first series of parallel lines to form a first coil; the ends of the first coil are adapted to be connected to a current source. The second sheet is rolled so that each of the first ends of the second series of parallel lines at the first edge of the second sheet engages a point on a different line in the second series of parallel lines to form a second coil. The number of turns in the first coil is different from the number of turns in the second coil. Finally, when the ends of the first coil are connected to a current source and the second coil is placed in a close proximity relationship to the first coil (e.g., a concentric relationship or a side-by-side relationship), a voltage potential will be generated along the length of the second coil. In this embodiment, it is possible to subject the second coil to a voltage tap to allow more than one voltage to be supplied by the second coil.

Similar to the capacitor and inductor embodiments, the first and second sheets of the transformer can be a variety of materials including coated or uncoated paper, fabric, plastic (transparent, translucent or opaque, coated or uncoated with an ink-receptive layer), Mylar, Tyvek, and paperboard. Moreover, the first and second series of parallel lines may be printed with inkjet ink or laserjet toner.

Another such circuit element herein described involves an isolation transformer which includes a sheet having a top side and a bottom side. A first series of parallel lines (each with first and second ends) is printed in electroconductive material on the top side of the sheet. A second series of parallel lines (each with first and second ends) is printed in electroconductive material on the bottom side of the sheet. The first series of parallel lines is printed: (a) at a first angle with respect to a first edge of the sheet (the first angle is non-normal to the first edge of the sheet); and (b) so that the first ends of the first series of parallel lines extend to the first edge of the sheet. The second series of parallel lines is printed: (a) at a second angle with respect to the first edge of the sheet (second angle being non-normal to the first edge of the sheet); and (b) so that the first ends of the second series of parallel lines extend to the first edge of the sheet.

In this embodiment, either the magnitude of the second angle is different from the magnitude of the first angle or the number of lines in the first series of parallel lines per unit length of the sheet is different from the number of lines in the second series of parallel lines per unit length of the sheet. When the sheet is rolled, each of the first ends of the first series of parallel lines at the first edge of the sheet engages a point on a different line in the first series of parallel lines to form a first coil; the ends of the first coil are adapted to be connected to a current source. Moreover, each of the first ends of the second series of parallel lines at the first edge of the sheet engages a point on a different line in the second series of parallel lines to form a second coil. The number of turns in the first coil is different from the number of turns in the second coil. Finally, when the ends of the first coil are connected to a current source, a voltage potential will be generated along the length of the second coil.

Another isolation transformer involves printing a series of parallel lines on the same side of a sheet. In this embodiment, an isolation transformer includes a sheet having a top side and a bottom side. A first series of parallel lines (each with first and second ends) is printed in electroconductive material on the top side of the sheet. An insulator covers the first series of parallel lines. A second series of parallel lines (each with first and second ends) is printed in electroconductive material on top of the insulator opposite the first series of parallel lines.

In this isolation transformer embodiment, the first series of parallel lines is printed: (a) at a first angle with respect to a first edge of the sheet (the first angle being non-normal to the first edge of the sheet); and (b) so that the first ends of the first series of parallel lines extend to the first edge of the sheet. The second series of parallel lines is printed: (a) at a second angle with respect to the first edge of the sheet (the second angle being non-normal to the first edge of the sheet); and (b) so that the first ends of the second series of parallel lines extend to the first edge of the sheet. Either the magnitude of the second angle is different from the magnitude of the first angle or the number of lines in the first series of parallel lines per unit length of the sheet is different from the number of lines in the second series of parallel lines per unit length of the sheet.

When the sheet is rolled, each of the first ends of the first series of parallel lines at the first edge of the sheet engages a point on a different line in the first series of parallel lines to form a first coil and each of the first ends of the second series of parallel lines at the first edge of the sheet engages a point on a different line in the second series of parallel lines to form a second coil. The first coil is adapted to be connected to a current source. The number of turns in the first coil is different from the number of turns in the second coil. When the ends of the first coil are connected to a current source, a voltage potential is generated along the length of the second coil.

Similar to the previously discussed capacitor, inductor, and transformer, both of the isolation transformers' sheets can be a variety of materials including coated or uncoated paper, fabric, plastic (transparent, translucent or opaque, coated or uncoated with an ink-receptive layer), Mylar, Tyvek, and paperboard. Moreover, the first and second series of parallel lines may be printed with inkjet ink or laserjet toner.

A structural understanding of the aforementioned electroconductive ink printed capacitor and inductor will be easier to appreciate when considering the detailed description in light of the figures hereafter described.

BRIEF DESCRIPTION OF THE DRAWINGS

The accompanying figures, which are incorporated in and constitute a part of the specification, illustrate presently preferred embodiments of the invention. Together with the above general description and the following detailed description, the figures serve to explain the principles of various embodiments of the invention.

DETAILED DESCRIPTION OF THE PREFERRED EMBODIMENT

Figure 1A:
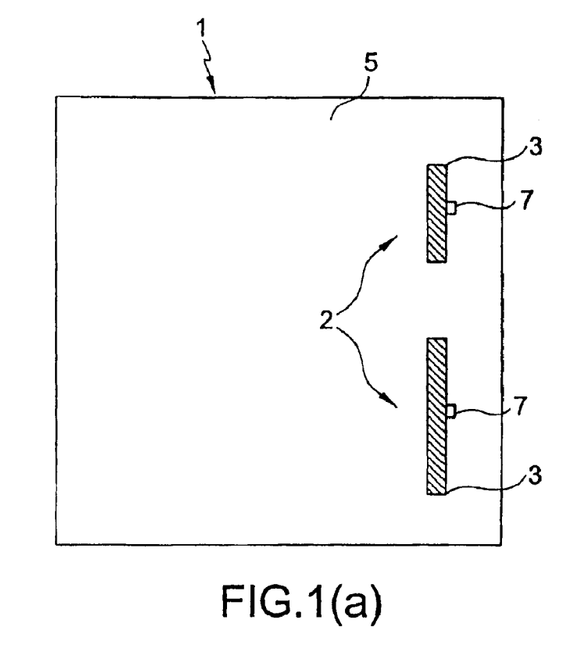
FIG. 1(a) is a top view of a sheet of an embodiment of the invention on which electroconductive lines are printed to form one side of a capacitor wherein the sheet is the capacitor dielectric.
Figure 1B:
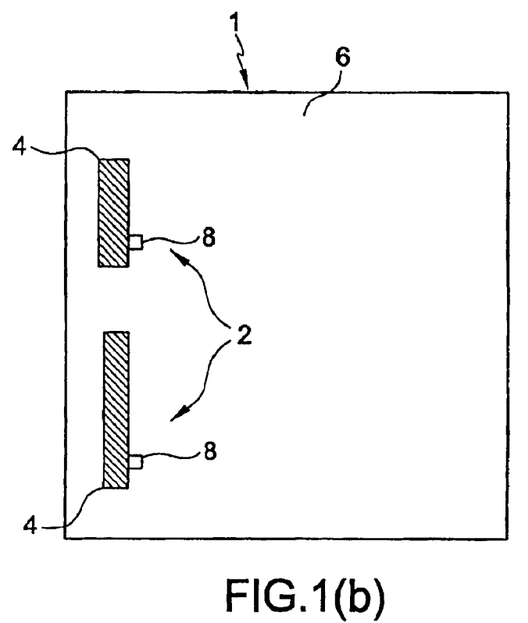
FIG. 1(b) is a bottom view of the sheet in FIG. 1(a) showing electroconductive lines printed on the underside thereof to form the other side of the capacitor in FIG. 1(a)

With respect to a first embodiment, FIGS. 1(a) and 1(b) show a top view and a bottom flipped view, respectively, of a sheet 1 on which electromagnetic material 2 is printed. Although it is preferable to use paper as the sheet 1, it is also possible to use numerous other substrates including plastics, paperboard, fabric, transparencies, Mylar, Tyvek, etc. Parallel lines 3 of electroconductive material 2 are printed on the top side 5 of the sheet 1, as shown in FIG. 1(a). In addition, parallel lines 4 are printed in electroconductive ink 2 on the bottom side 6 of the sheet 1 (as shown in FIG. 1(b)) in such a fashion that one set of lines 3 on the top side 5 of the sheet 1 are directly above (through the sheet 1) the lines 4 printed on the bottom side 6 of the sheet 1. The parallel lines 3 on the top side 5 and the parallel lines 4 on the bottom side 6 serve as capacitor 10 plates, as discussed below.

Leads 7, 8, which are printed at the ends of the lines 3, 4 can be connected to a circuit (not shown). The leads 7, 8 could be connected anywhere on lines 3, 4. However, from a printing standpoint, it is more practical to position the leads 7, 8 along a central portion of the lines 3, 4. If the lead 7 on the top side 5 of the sheet 1 (and connected to the line 3 printed thereon) is directly above the lead 8 on the bottom side 6 of the sheet (and connect to the line 4 printed thereon), additional capacitance will be added as the leads 7, 8 will act as a capacitor. To counteract this possibility, it is preferable to orient the leads 7 on the top side 5 of the sheet 1 in such a way that it is not directly above (through the sheet 1) the lead 8 on the bottom side 6 of the sheet.

Although the leads 7, 8 can simply be conductive wires, it is more practical to use a metallic foil. The foils may be attached to the sheet 1 by transfer overlay which may be adhered thermally, such as with LaserFoil, or attached with pressure (as with transfer lettering), or attached with tape-like adhesion at the lateral edges of the foil, or attached with standard commercial foil printing methods.

Although it is possible to use electroconductive paint or an organometallic material such as polyaniline as the electroconductive material 2, it is preferable to use either electroconductive inkjet ink or electroconductive laserjet toner. There are multiple reasons for the preference including: (a) the amount of non-conductive material in electroconductive paint (e.g., binders, extenders, pigments, resins, etc.) may create an undesirable and excessive insulation; (b) using electroconductive ink or laserjet toner aids in precision, replicability, and uniformity of application; (c) it is more difficult to modify circuit designs using electroconductive paint; and (d) colorants may be added to electroconductive ink or laserjet toner to identify various circuit components. Example of an acceptable electroconductive ink include C-100 and AG-500 available from Conductive Compounds, 23 Londonderry Road, Suite 15, Londonderry, N.H. 03053.

Numerous methods exist by which lines 3, 4 of electroconductive material 2 can be deposited on a sheet 1. The preferred method, using electroconductive ink employs an inkjet printer (thermal or piezoelectric). Electroconductive ink can be deposited according to the method disclosed in U.S. Pat. No. 5,808,637. If an ink requiring UV-induction of polymerization is used, a UV light source must be added to the printing mechanism. Of course, if electroconductive laserjet toner is used, a laser printer would be employed. Other possible methods include vacuum deposition, plating, foil transfer, and standard integrated and printed circuit manufacture.

Figure 1C:
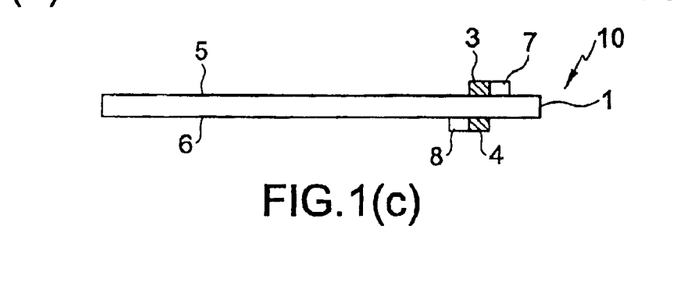
FIG. 1(c) is an exaggerated side view of the capacitor shown in FIGS. 1(a) and 1(b)

FIG. 1(c) shows a capacitor 10 created by a pair of lines 3, 4 one of which 3 is on the top side 5 of the sheet 1 and the other of which 4 is on the bottom side 6 of the sheet 1 directly below the line 3 on the top side 5. The lines 3, 4 serve as capacitor 10 plates whereas the sheet 1 serves as the dielectric for the capacitor 10. Moreover, the line 3 on the top side 5 of the sheet 1 and the line 4 on the bottom side 6 of the sheet 1 can both be printed without having to flip-over the sheet 1 and re-feed it through the printer; this is possible using a printer have a duplexer such as the Hewlett Packard DeskJet 970 and 990 inkjet printers.

Figure 2A:
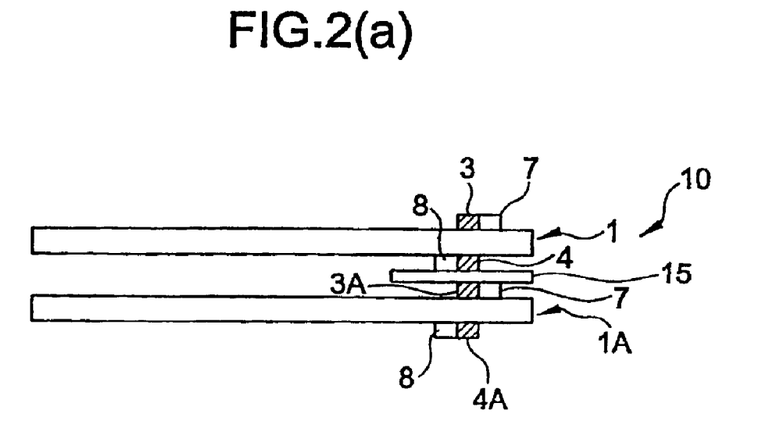
FIG. 2(a) is an exaggerated side view of a multiplate capacitor of an embodiment of the invention formed from two sheets.
Figure 2B:
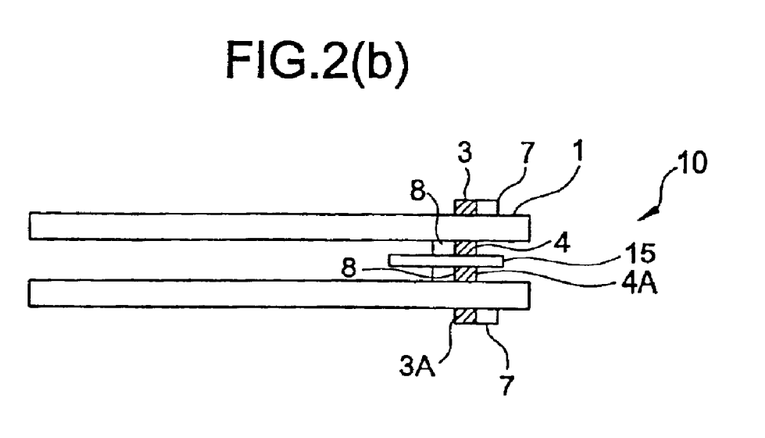
FIG. 2(b) is an exaggerated side view of the multiplate capacitor of FIG. 2(a) in which the lower sheet is inverted.
Figure 2C:
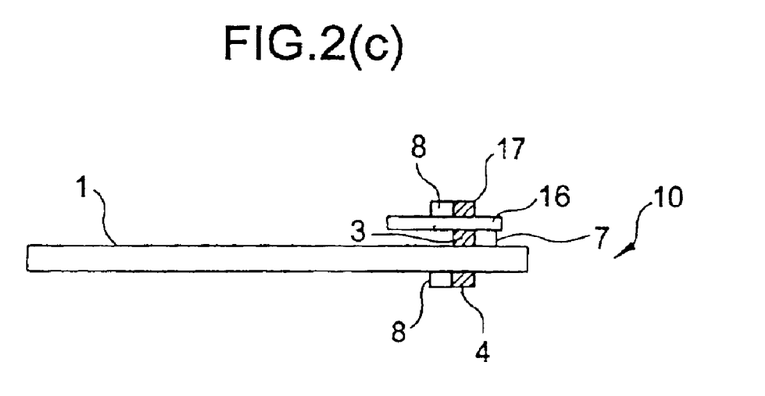
FIG. 2(c) is an exaggerated side view of a multiplate capacitor of an embodiment of the invention formed for printing electroconductive lines on both sides of a sheet and then covering one of the electroconductive lines with an insulator and then printing a third electroconductive line on top of the insulator.

It is also possible, as shown in FIG. 2(a), to position a first sheet 1 on top of a second sheet 1A such that if the line 4 printed on the bottom of the first sheet 1 is separated from the line 3A on top of the second sheet 1A by an insulator 15 (which may be air), a multi-plate capacitor can be created whereby the voltage potential exists between the line 3 on the top of the first sheet 1 and the line 4A on the bottom of the second sheet 1A. As shown in FIG. 2(a), it is also possible to invert the orientation of the second sheet 1A such that line 4A is on the top of the second sheet 1A and is separated from line 4 on the bottom of the second sheet by an insulator 15. Finally, as shown in FIG. 2(c), a multiplate capacitor could also be formed by printing a layer of insulation 16 on top of one of electroconductive lines 3 and then printing another electroconductive line 17 on top of the layer of insulation.

Figure 3A:
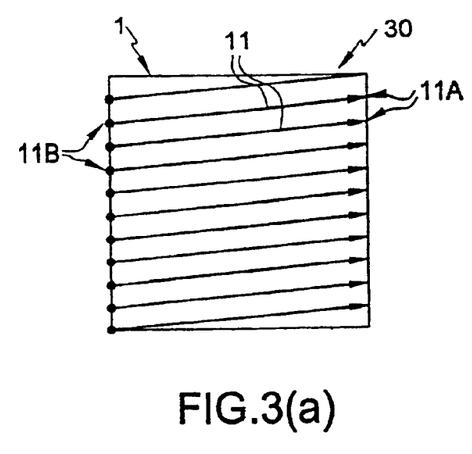
FIG. 3(a) is a top view of a sheet on which electroconductive lines are printed for use in creating an inductor of an embodiment of the invention.
Figure 3B:
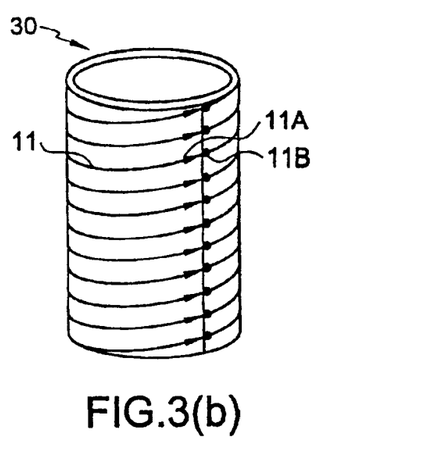
FIG. 3(b) is a perspective view of the sheet in FIG. 3(a) showing a sheet rolled to create a coil, to form an inductor.
Figure 3C:
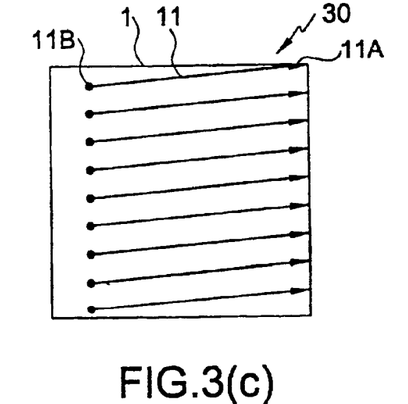
FIG. 3(c) is a top view of a sheet showing how lines which only extend to one edge of the sheet in an embodiment of the invention.
Figure 3D:
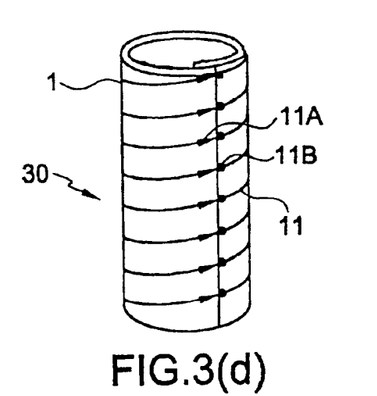
FIG. 3(d) is a perspective view of the sheet of FIG. 3(c) rolled so that the ends of the lines which extend to the edge of the sheet match-up with other portions of the lines to create a coil, to form an inductor.
Figure 3E:
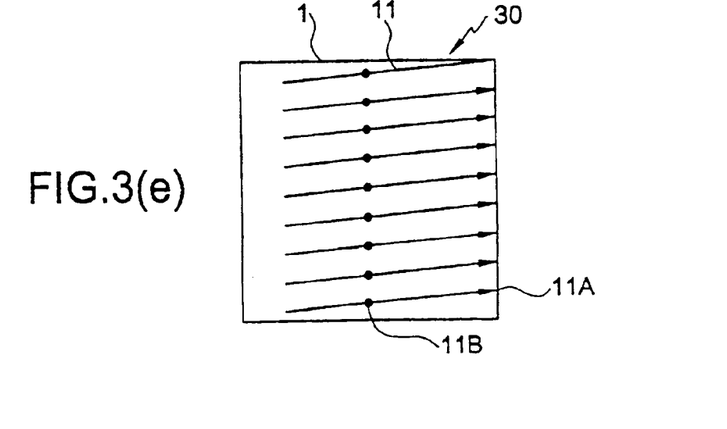
FIG. 3(e) is a top view of a sheet showing lines which extend to one edge of the sheet and which are printed in such a fashion so that when the sheet is rolled the ends of the lines at the end will encounter a point along the length of another line.

With regard to FIGS. 3(a) and 3(b), an inductor 30 will now be described. A series of lines 11 is printed in electroconductive ink 2 on a sheet 1 at an angle with respect to the length direction of the sheet 1. When the sheet is rolled, one end of the line 11 (represented by arrowheads 11A) engages a point on another line (which can be at a point along the lines 11 or at the other end of the lines 11 represented by dots 11B) are joined to form a coil of electroconductive material which can act as an inductor 30. When the ends of the coil are connected across a current source (not shown), the coil will generate an electromagnetic field. As shown in FIG. 3(c), although one end of the lines 11 must start at an edge of the sheet 1, the other end of the lines 11 does not need to extend to the opposite edge. FIG. 3(d) shows that when the sheet 1 is rolled far enough the ends of the lines 11 at the edge will come into contact which other lines (although there may be some overlapping of the sheet 1). Moreover, and as shown in FIG. 3(d), the lines 11 need not be printed in such a fashion that the end of a line 11 at the edge of the sheet must encounter the very end of another line 11. The sheet 1 of FIG. 3(d) can be rolled such that the ends of the lines 11 at the edge can encounter a point 11B along the interior of other lines 11, as shown in FIG. 3(e). The ends of the lines 11 at the edge are held in contact with the points 11B along the lines 11 by an electroconductive material such as electroconductive glue or foil.

Figure 4A:
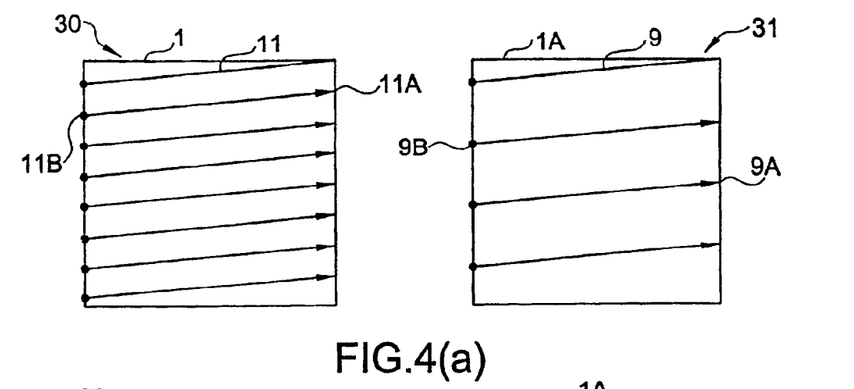
FIG. 4(a) is a top view of two different inductor sheets in an embodiment of the invention.
Figure 4B:
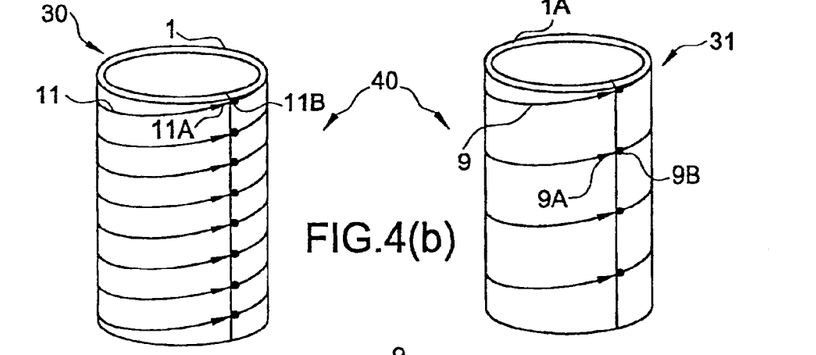
FIG. 4(b) is a perspective view of the two different inductor sheets of FIG. 4(a) shown in a side-by-side arrangement forming a transformer.
Figure 4C:
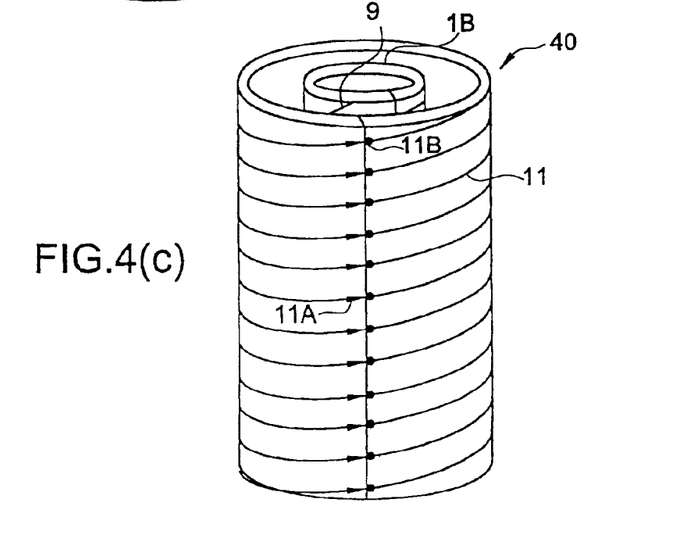
FIG. 4(c) is a perspective view of the two different inductor sheets of FIG. 4(a) shown in a concentric arrangement forming a transformer.

As shown in FIG. 4(a), where a second sheet 1A has a series of lines 9 printed thereon in a fashion similar to the series of lines 11 printed on the aforementioned sheet 1 but at a different angle, an inductor 31 is created when that sheet 1A is rolled and the ends 9A of the lines 9 at the edge of the sheet 1A are brought into contact with points 9B on other lines 9 to form coils. As shown in FIG. 4(b), the inductor 31 formed by the rolled sheet 1A, will have a different number of coils as compared to the first inductor 30 due to the different angles at which the ends of the lines 11, 9 meet the edge of the sheets 1, 1A. It is also possible, of course, to alter the number of coils by changing the number of lines per unit length of a sheet 1. When the first inductor 30 (having a current flowing therethrough) is put in close proximity to the second inductor 31, a transformer 40 is created. Such a close proximity relationship can be either a side-by-side arrangement (as shown in FIG. 4(b)) or a concentric arrangement (as shown in FIG. 4(c)). The electromagnetic field generated by the first inductor 30 will induce a voltage potential in the second inductor 31. The magnitude of the voltage induced in the second inductor 31 as compared to the voltage across the first inductor 30 will depend on the ratio of the number of coils in each of the inductors 30, 31.

For example, if the first inductor 30 has more coils than the second inductor 31 (as shown in FIG. 4(b)), the voltage potential across the second inductor 31 will be smaller than the voltage potential across the first inductor 30; similarly if the first inductor 30 has fewer coils than the second inductor 31, the voltage potential across the second inductor 31 will be greater than the voltage potential across the first inductor 30. Theoretically, the differences in the voltage potentials across the inductors 30, 31 should correspond directly to the number of coils in each inductor (i.e., if the first inductor 30 has ten coils and the second inductor 31 has twice as many coils, the voltage potential across the second inductor 31 would be twice that of the voltage potential across the first inductor 30). Similar to conventional transformers, where two inductors 30, 31 are formed according to the above-described invention, one can be subject to a voltage tap allowing more than one voltage to be supplied by the second inductor 31.

Figure 5A:
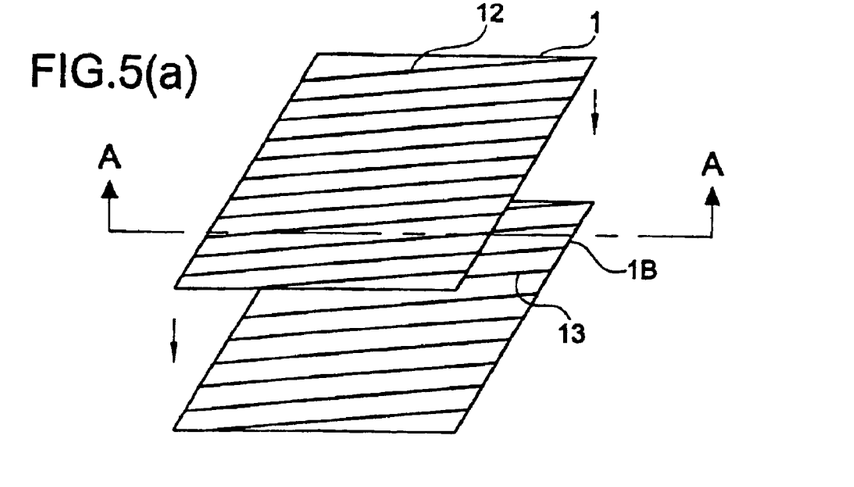
FIG. 5(a) is a perspective view of two inductor sheets in an embodiment of the invention, one of which is to be laid directly on top of the other.
Figure 5B:
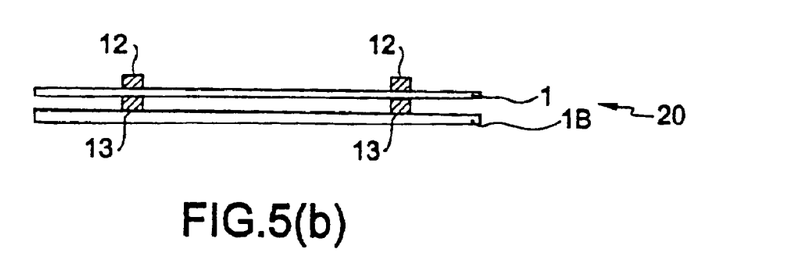
FIG. 5(b) is an exaggerated side view of the two inductor sheets taken along line A—A of FIG. 5(a), showing the one sheet positioned on top of the other.
Figure 5C:
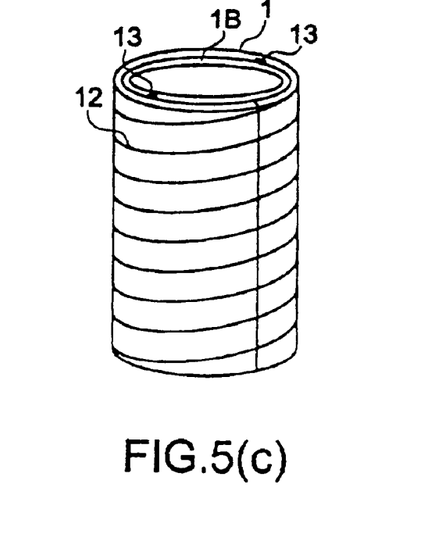
FIG. 5(c) is a perspective view of the two inductor sheets of FIGS. 5(a) and 5(b) shown in a rolled fashion thereby creating an inductor/capacitor.

FIGS. 5(a) and 5(b) depict another embodiment of the invention herein described using two inductors 30 as previously described, but with one sheet 1 superimposed on a second sheet 1B. Where the series of parallel lines 12 printed in electroconductive ink 2 on the first sheet 1 are aligned with an identical series of parallel lines 13 printed on the section sheet 1B, each pair of lines 12, 13 creates a capacitor 20 as previously described. When the sheets 1, 1B are rolled to form two concentric inductors 30 (as shown in FIG. 5(c)) having inductance properties, the sheets 1, 1B retain their capacitance properties. The resultant invention, having both inductance and capacitance properties, can be used for a variety of applications including, for example, designing inkjet and/or laserjet printable resonance circuits and sensors which are used in low current, high voltage situations.

Figure 5D:
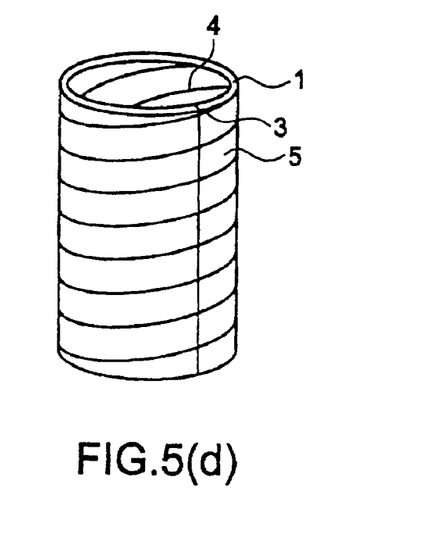
FIG. 5(d) is a perspective view of one sheet in an embodiment of the invention having a series of parallel lines printed on the top side and the bottom side which has been rolled to form an inductor having capacitance properties.

Note, as shown in FIG. 5(d), that this embodiment can also be achieved by printing on both sides of one sheet 1 according to the previously discussed manner of making a capacitor 10. If one sheet 1 is used, the lines 3 on the top side 5 of the sheet 1 and the lines 4 on the bottom side 6 of the sheet 1 must: (a) be oriented at an angle with respect to an edge of the sheet 1; and (b) extend to at least one of the edges of the sheet so that when the sheet 1 is rolled it will be possible to create an inductor 30, as previously described.

Figure 5E:
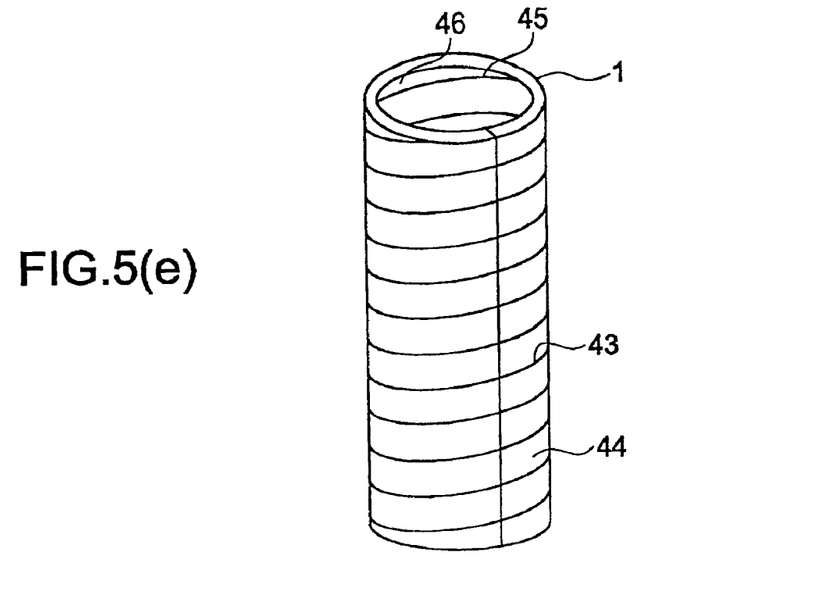
FIG. 5(e) is a perspective view of an isolation transformer in an embodiment of the invention formed by printing one set of electroconductive lines on one side of a sheet an another set of electroconductive lines on the other side of the sheet such that when the sheet is rolled, as shown in the figure, coils of electroconductive material are formed on the inside and the outside of the rolled sheet.

The embodiment shown in FIG. 5(d) leads itself to a design of an isolation transformer as shown in FIG. 5(e). The isolation transformer 42 is formed by printing one set of lines 43 on one side 44 of a sheet 1 and another set of lines 45 on the opposite side 46 of the sheet 1. One of the sets of lines 45 must extend from one edge of the sheet 1 to the opposite edge of the sheet 1. If the first set of lines 43 is either printed at a different angle with respect to the edge of the sheet 1 than the second set of lines 45 or has a different number of lines 43 per unit length of the sheet 1 than does the second set of lines 45, when rolled the sheet 1 will have two sets of coils, one on each side of the sheet 1, with a different number of turns in each coil. Accordingly, and as shown in FIG. 5(e), when the sheet 1 is rolled, a coil is formed from the lines 43 printed on one side 44 of the sheet 1; another coil is formed by the lines 45 on the other side 46 of the sheet 1. Together the two coils form an isolation transformer 42.

Figure 5F:
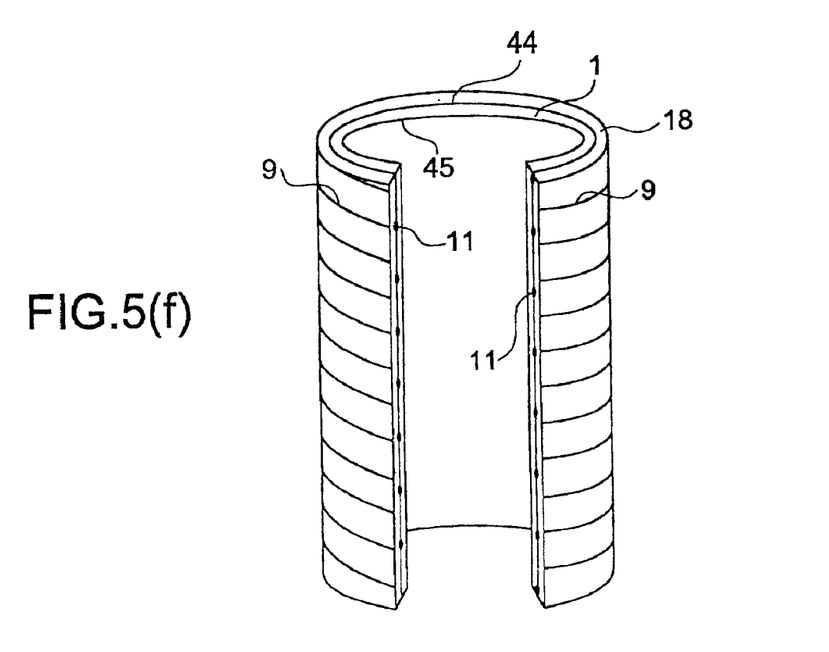
FIG. 5(f) is a perspective view of an isolation transformer in an embodiment of the invention (a portion of which has been cut-out to aid in viewing) in which both sets of coils in the transformer are printed on the same side of a sheet but are separated by an insulator.

Finally, and as depicted in FIG. 5(f), using the aforesaid teachings regarding the capacitor 10, it is also possible to cover the lines 11 on one side of a sheet 1 with an insulator 18 and then print a second set of lines 9 on top of the insulator 18. Depending on the orientation and alignment of the second set of lines 9, it is possible to achieve capacitance results similar to those disclosed with respect to FIG. 5(d) or to an isolation transformer 42 similar to that shown in FIG. 5(e).

The capacitor herein described can be produced in various sizes and shapes to produce the exact capacitance desired by a user. Alternatively, various of the capacitors can be stacked to control the capacitance and voltage desired. Moreover, to further attain a desired capacitance, the capacitor may be trimmed (e.g., with scissors or a precision cutter) due to its paper-like thickness, something which is impossible to do with conventional capacitors.

Flexible sheet capacitors (of the nature herein described) having sufficient widths can be used as sensors; when an item either barely contacts the capacitor or comes within a close proximity of the capacitor, the capacitance will be greatly affected. Similarly, a custom designed inductor (of the nature herein described) could act as a sensor; the inductor would be responsive to external magnetic field changes which will affect the current flow through the inductor. Moreover, such flexible sheet inductors can be "slug" tuned (just like a wire wound inductor). The capacitors can also be tuned like trimmer capacitors in which the capacitance is altered by compressing the dielectric.

It should also be appreciated that using electroconductive ink printing to create a capacitor or an inductor can aid in circuit design as the design and capacitance of the capacitor (or the inductance of the inductor) can be readily attained and changed by the circuit designer using computer aided drawing or manufacturing (CAD/CAM).

The extent of the electroconductive material 2 used on a sheet 1 will impact the capacitance or inductance properties generated. The surface area of opposing lines in a capacitor 10 formed according to the embodiments herein disclosed will affect the capacitance generated. Moreover, the density of printing, the electroconductivity and electromagnetism of the dried electroconductive material 2 will impact capacitance and inductance. One can alter the capacitance, inductance, and resistance of a capacitor 10 or inductor 30 (built according to the embodiments previously discussed) by altering a number of parameters including: (a) the dimensions and shape of the printing; (b) the thickness of the printing; (c) the density of the printing (d) the tightness of the coil in an inductor 30; the distance between the lines 3, 4 in a capacitor 10 (i.e., the thickness of the sheet 1); and (e) by piling numerous sheets 1 on top of each other, each of which has electroconductive material 2 printed thereon. To increase the density of the printing (and thereby the electroconductivity displayed), one can undertake a variety of alternatives including printing more drops of electroconductive material 2 per unit area, by printing the same area numerous times (i.e., by running the print head back-and-forth over the area), and/or by increasing the concentration of electroconductive components in the electroconductive material 2.

Although the aforementioned described various embodiments of the invention, the invention is not so restricted. The foregoing description is for exemplary purposes only and is not intended to be limiting. Accordingly, alternatives which would be obvious to one of ordinary skill in the art upon reading the teachings herein disclosed, are hereby within the scope of this invention. The invention is limited only as defined in the following claims and equivalents thereof.

What is claimed is:

1. An inductor component comprising:
    a first sheet having a top side and a bottom side;
    a first series of parallel lines having first and second ends, said first series of parallel lines being printed in electroconductive material on the top side of the first sheet, wherein
    the first series of parallel lines is printed at a first angle with respect to a first edge of the first sheet, said first angle being non-normal to the first edge of the first sheet, wherein the first ends of the first series of parallel lines extend to the first edge, and wherein the first sheet is adapted to be rolled, and wherein
    if the first sheet is rolled, each of the first ends of the first series of parallel lines at the first ends of the first sheet will engage a point on a different line in the first series of parallel lines to form a first coil, and wherein the ends of the first coil are adapted to be connected to a current source to create a voltage potential across the length of the first coil.

2. The inductor component according to claim 1, wherein the second ends of the first series of parallel lines are at a second edge of the first sheet opposite the first edge.

3. The inductor component according to claim 1, wherein the second ends of the first series of parallel lines do not extend to a second edge of the sheet opposite the first edge.

4. The inductor component according to claim 2, wherein second ends are the points at which each of the first ends of the first series of parallel lines engage a different line in the first series of parallel lines.

5. The inductor component according to claim 2, wherein the points at which each of the first ends of the first series of parallel lines engage a different line in the first series of parallel lines are between the first ends and the second ends.

6. The inductor component according to claim 3, wherein second ends are the points at which each of the first ends of the first series of parallel lines engage a different line in the first series of parallel lines.

7. The inductor component according to claim 3, wherein the points at which each of the first ends of the first series of parallel lines engage a different line in the first series of parallel lines are between the first ends and the second ends.

8. The inductor component according to claim 1, wherein the first sheet is selected from the group consisting of paper, fabric, plastic, Mylar, Tyvek, and paperboard.

* * * * *

UNITED STATES PATENT AND TRADEMARK OFFICE
CERTIFICATE OF CORRECTION

PATENT NO. : 6,922,125 B2
DATED : July 26, 2005
INVENTOR(S) : Lee

It is certified that error appears in the above-identified patent and that said Letters Patent is hereby corrected as shown below:

Column 10,
Line 59, delete "ends" and insert -- edge --.

Signed and Sealed this

Twentieth Day of December, 2005

JON W. DUDAS
*Director of the United States Patent and Trademark Office*